United States Patent

[11] 3,618,050

[72] Inventors Richard H. Heeren
Chicago;
Charles R. Winston, Deerfield, both of Ill.
[21] Appl. No. 822,521
[22] Filed May 7, 1969
[45] Patented Nov. 2, 1971
[73] Assignee Teletype Corporation
Skokie, Ill.

[54] READ-ONLY MEMORY ARRAYS IN WHICH A PORTION OF THE MEMORY-ADDRESSING CIRCUITRY IS INTEGRAL TO THE ARRAY
17 Claims, 7 Drawing Figs.

[52] U.S. Cl. ........ 340/173 SP, 307/279
[51] Int. Cl. ........ G11c 17/00, G11c 11/40, G11c 7/00
[50] Field of Search ........ 340/173; 307/279

[56] References Cited

OTHER REFERENCES

IBM Technical Disclosure Bulletin, " Field Effect Transistor Read Only Storage Unit" by Gurski, Vol. 7, No. 11, 4165, pgs. 1107- 1108, copy in 340- 173 Semi-Perm.
Mosfet In Circuit Design, by Robert H. Crawford, McGraw-Hill Book Company, copyright 1967, pages 113- 118, copy in 340- 173 Semi-Perm.

*Primary Examiner*—Stanley M. Urynowicz, Jr.
*Attorney*—J. L. Landis

ABSTRACT: Two embodiments of read-only memory arrays arranged in columns and rows are disclosed in which, for each embodiment, one of a pair of accessing circuits is included as additional columns therein. The memory array includes a plurality of field-effect transistors positioned in selected patterns at intersections of rows and columns defining a matrix. Each transistor in a column is connected to be actuated in parallel by a column conductor, providing an ON impedance in their respective rows. A selected group of the columns are memory columns, in which the location of the transistors is selected in accordance with a desired information pattern to be read out. Further columns are access columns in which the transistors are located in selected different patterns to provide an ON impedance in all but a selected one of the rows in response to different switching signal patterns.

INVENTORS
RICHARD H. HEEREN
CHARLES R. WINSTON
BY J. L. Landis
ATTORNEY

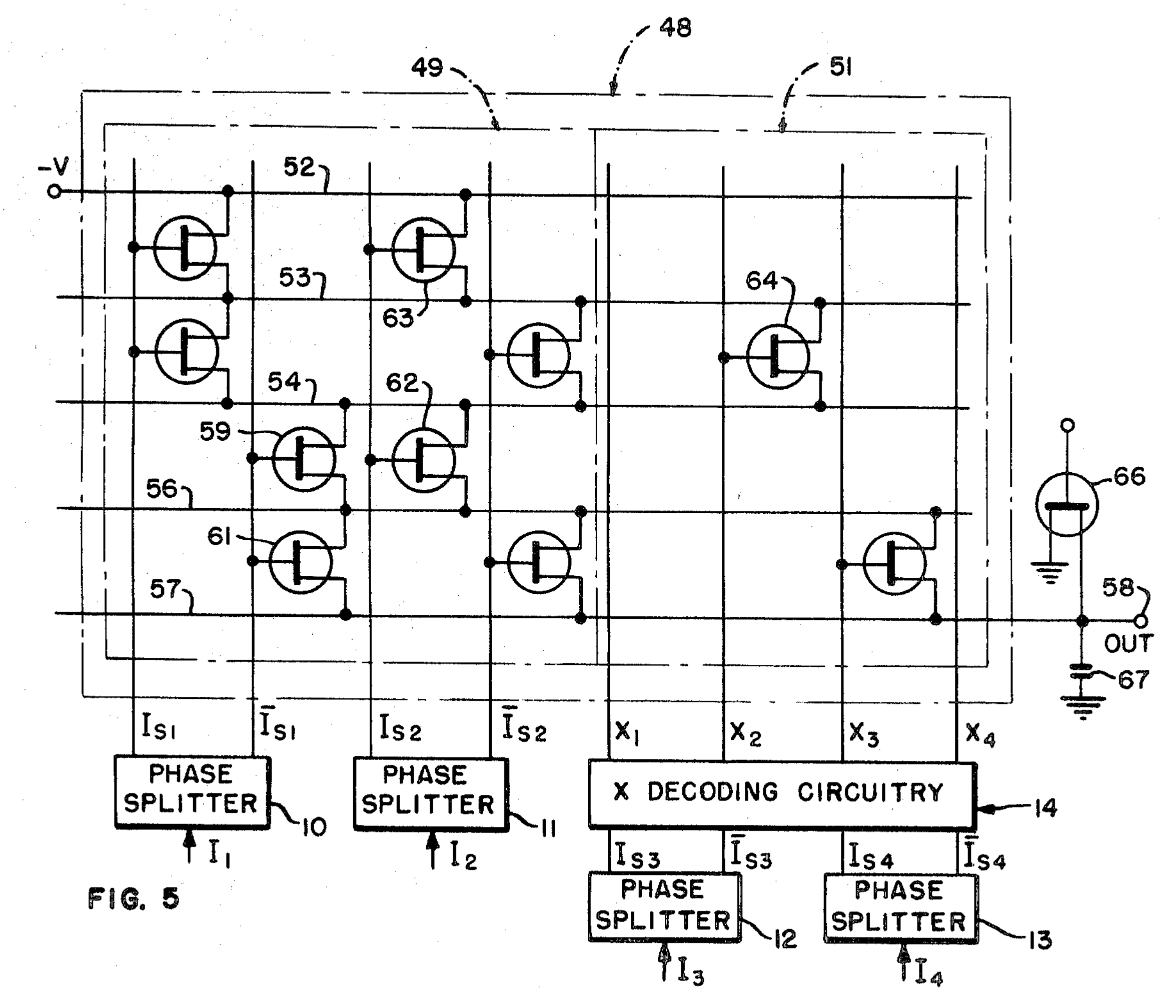
FIG. 5
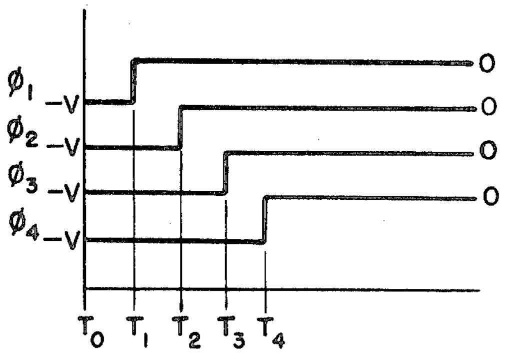
FIG. 4
FIG. 6
| $I_3$ | $I_4$ | $X_1$ | $X_2$ | $X_3$ | $X_4$ |
|---|---|---|---|---|---|
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 |
FIG. 7
| $I_1$ | $I_2$ | $Y_1$ | $Y_2$ | $Y_3$ | $Y_4$ |
|---|---|---|---|---|---|
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 |

READ-ONLY MEMORY ARRAYS IN WHICH A PORTION OF THE MEMORY-ADDRESSING CIRCUITRY IS INTEGRAL TO THE ARRAY

FIELD OF THE INVENTION

This invention relates to read-only memory arrays and particularly to read-only memory arrays in which a portion of the memory-addressing circuitry is integral to the array.

BACKGROUND OF THE INVENTION

Read-only memories are employed as components in digital data processing systems. Predetermined information is stored in a read-only memory for use in the data processing system. The information stored in the memory is typically accessed by a binary coded signal which is internally generated by the data processing system normally as an intermediate result in a data processing sequence.

Information is often represented in a read-only memory by the presence and absence of electrical devices at predetermined memory locations. To minimize the number of access leads required to access all the information stored in the memory, the memory locations are arranged in a matrix of columns and rows.

The binary coded access signal is therefore broken down into two parts, one part for accessing columns and the other for accessing rows. For each intersection of a column and a row, unique information bits are obtained. In most memories the two parts of the digital access signal are next passed through a pair of code-translating circuits to provide column and row selection signals. For an example of a code-translating circuit see a related, copending patent application of applicant R. H. Heeren, entitled "Code Translating Circuits," Ser. No. 822,533, filed on even date herewith.

When read-only memories are fabricated by integrated circuit techniques, the devices employed in the memory can be organized in a compact arrangement thereby efficiently utilizing the available space for active components. The code-translating circuits on the other hand are not normally as simple or symmetrical as the memory array, therefore, an undue amount of chip area is consumed by the code-translating circuits.

SUMMARY OF THE INVENTION

In accordance with this invention, a read-only memory array is provided in which accessing circuitry is included in the memory array.

The memory array includes switching-signal-controlled impedance devices selectively positioned at intersections of columns and rows. Each of the controlled impedance devices in a column is collected to be actuated in parallel providing an ON impedance in their respective rows upon actuation. The memory array is characterized in that a select group of the columns are memory columns in which the controlled impedance devices are located at selected positions, in accordance with a desired information pattern. A second group of columns are access columns. The devices in the access columns are located to provide an ON impedance in all but a select one of the rows in response to a predetermined switching signal pattern being applied thereto.

In one embodiment, an output circuit is provided which exhibits a first logical output level in response to an OFF impedance condition existing everywhere in one of the rows and a second logical level in response to an ON impedance condition existing in all of the rows.

DESCRIPTION OF THE DRAWINGS

FIG. 4 is a timing diagram showing clock signals employed to drive the memory circuit of FIG. 3.

FIG. 5 shows partially in schematic and partially in block diagram form, a second memory constructed in accordance with the teachings of this invention.

FIG. 6 is a truth table for an X-decoder employed in a memory as taught by this invention.

FIG. 7 is a truth table for the Y-decoding function performed integral to the memory array in accordance with teachings of this invention.

DETAILED DESCRIPTION OF THE INVENTION

Figures 2, 3:
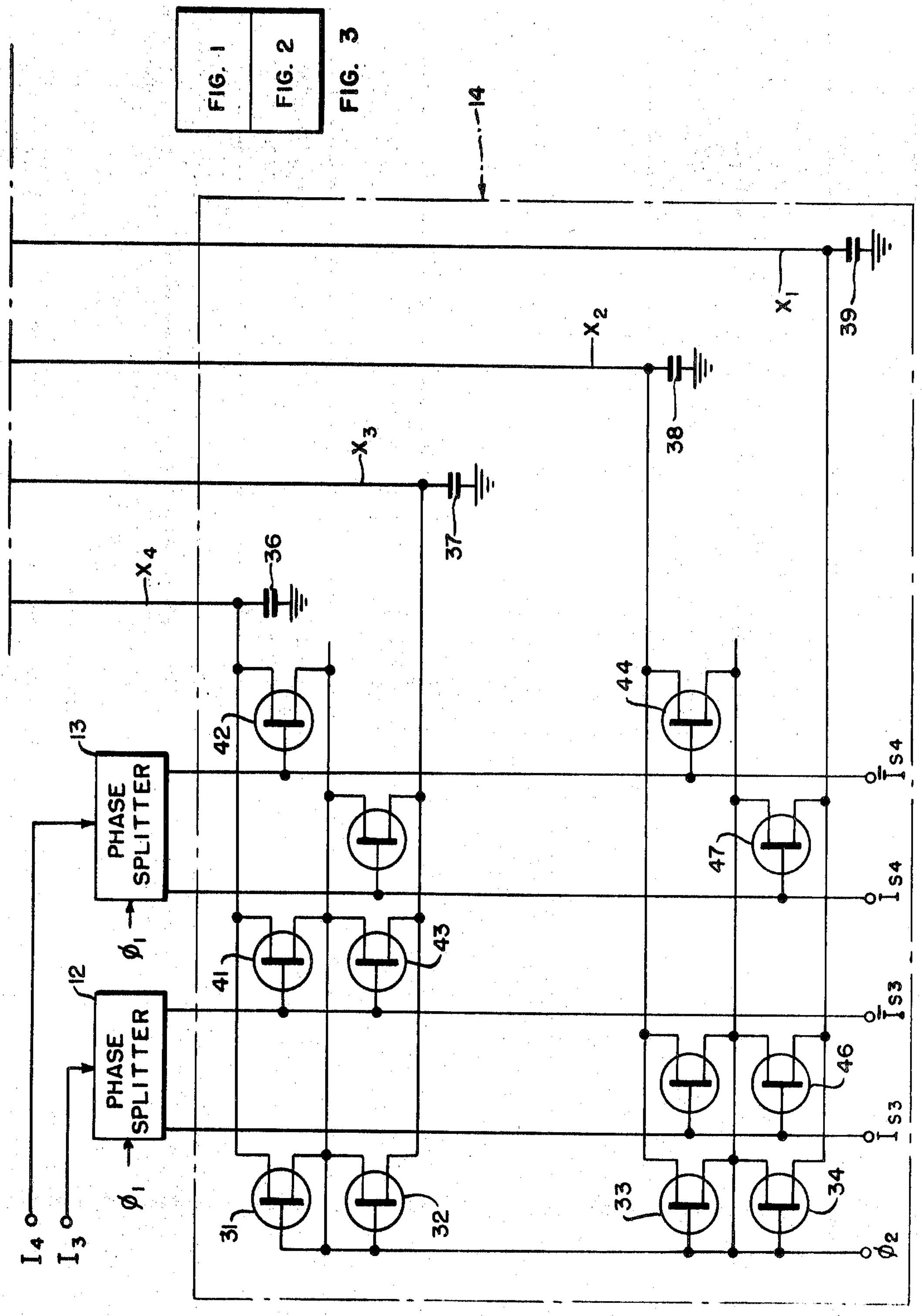
FIG. 2 is a circuit diagram of an X-decoder circuit used in a memory circuit of this invention.
FIG. 3 is a block diagram showing how the circuits of FIGS. 1 and 2 are connected together to provide a read-only memory in accordance with the teachings of this invention.

In a read-only memory digitally coded information signals are employed to access permanently stored data. With FIGS. 1 and 2 taken together as shown in FIG. 3, a simplified read-only memory is illustrated in which 16 stored data bits can be accessed by a four-bit data word. The memory array can be looked upon as having five major portions; input circuitry including phase splitters 10–13, an X-decoding circuit 14, a matrix 16 having a Y-decoding section 17 and a storage section 18, and an output circuit 19. It should be noted that in the memory portion shown in FIG. 1, the storage section 18 and the Y-decoding section 17 are physically indistinguishable parts of the matrix 16.

Each of the five major portions of the read-only memory may be dynamic logic circuits of the type disclosed in a related, copending patent application of applicant R. H. Heeren entitled "A Dynamic Logic System," Ser. No. 822,520, filed on even date herewith, but other forms of dynamic logic and/or static (DC) logic may be used to implement the principles and teachings of this invention. The matrix 16, which includes both the storage section 18 and the Y decoding section 17, is made up of essentially four dynamic logic circuits in accordance with the application just mentioned. Each row of the matrix 16 (terminating at output terminals $Y_1$, $Y_2$, $Y_3$, and $Y_4$, respectively) is formed by a separate dynamic logic circuit. Field-effect transistors 21, 22, 23 and 24, one in each row of the matrix 16 and being P-channel enhancement mode devices in the example illustrated, serve as gating transistors to precharge capacitors 26, 27, 28, 29, respectively, when a negative signal is applied to a lead 30 interconnecting the gates and the drains of all the field-effect transistors 21, 22, 23 and 24. The remaining field-effect transistors in each row of the matrix 16, also being P-channel enhancement mode devices, serve as a logic network for the respective gating field-effect transistor in that row.

When the signal on the lead 30 is brought to ground level, the field-effect transistors 21, 22, 23, and 24 are brought to a high-impedance condition leaving the capacitors 26, 27, 28, and 29 negatively charged. If any one of the remaining field-effect transistors in a particular row has a negative signal on the gate thereof (indicating specific data conditions as will be explained hereafter), the respective capacitors 26, 27, 28, or 29 in that row will be discharged through that field-effect transistor to the ground level now appearing on lead 30.

The signals applied to the gates of the various field-effect transistors in the matrix 16 are generated in accordance with the received data word, in the example a four-bit binary word, the individual bits of which appear on corresponding input terminals $I_1$, $I_2$, $I_3$, and $I_4$. Two of the signals, $I_1$ and $I_2$, are applied to the phase splitters 10 and 11 which may be of the type disclosed in the previously mentioned application "A Dynamic Logic System," providing output signals on leads $I_{s1}$, $\overline{I}_{s1}$, $I_{s2}$, and $\overline{I}_{s2}$, each of which is applied to all the field-effect transistors in one corresponding column of the matrix 16. The remaining signals $I_3$ and $I_4$ are similarly applied to the phase splitters 12 and 13 providing output signals on leads $I_{s3}$, $\overline{I}_{s3}$, $I_{s4}$, and $\overline{I}_{s4}$, each of which is applied to a group of field-effect transistors on the X-decoding circuitry 14.

The output signals appearing on leads $I_{s1}$, $I_{s2}$, $I_{s3}$, and $I_{s4}$ are similar to the input signals appearing on leads $I_1$, $I_2$, $I_3$, and $I_4$. The signals appearing on leads $\bar{I}_{s1}$, $\bar{I}_{s2}$, $\bar{I}_{s3}$, and $\bar{I}_{s4}$ are essentially inversions of the signals applied to the phase splitters 10, 11, 12, and 13. Therefore, it should be clear that the function performed by the phase splitters 10, 11, 12, and 13 could also be performed by a simple inverting amplifier.

The X-decoding circuitry 14 shown particularly in FIG. 2, together with phase splitters 12 and 13, translates the two bits $I_3$ and $I_4$ of the binary coded received data word into a distinctive "one out of four" signal on a corresponding one of four leads $X_1$, $X_2$, $X_3$, and $X_4$ to access one and only one column in the storage section 18 of the matrix 16 for each combination of digital signals applied to the input terminals $I_3$ and $I_4$. The truth table for the X-decoding circuitry 14 is shown in FIG. 6.

In operation a negative voltage is applied to an input terminal $\Phi_2$ of the X-decoding circuitry 14, for a time $T_0$–$T_2$, as shown in FIG. 4, bringing the gates and drains of a set of four gating field-effect transistors 31, 32, 33, and 34 to a negative potential. This negative potential charges a capacitor 36 through field-effect transistor 31, capacitor 37 through field-effect transistor 32, capacitor 38 through field-effect transistor 33, and capacitor 39 through field effect transistor 34, all capacitors thus being precharged to the negative potential on the input terminal $\Phi_2$.

After a predetermined precharge interval from $T_0$–$T_2$, the terminal $\Phi_2$ is brought to ground bringing the gating transistors 31, 32, 33, and 34 to a high-impedance condition and preventing discharge of the capacitors 36–39 therethrough to the now grounded terminal $\Phi_2$. During a second time interval after $T_2$, the capacitors 36, 37, 38, and 39 will be discharged if any transistor in the X-decoding circuitry connected thereto is in a low-impedance condition.

Figure 1:
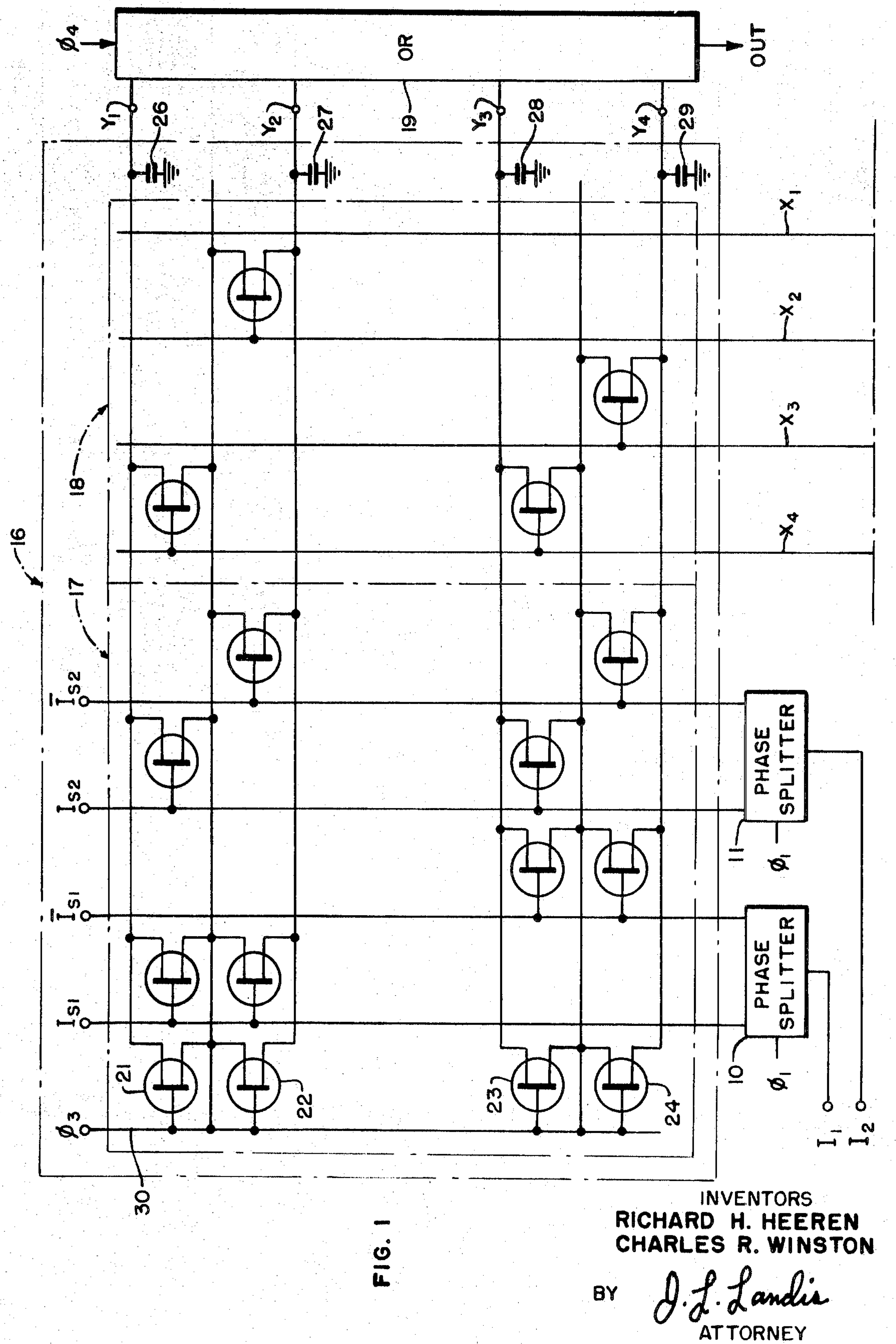
FIG. 1 is a schematic circuit diagram of a portion of a memory constructed in accordance with the principles of this invention particularly showing the memory matrix portion thereof.

Looking now at FIGS. 1, 2, and 6 together, we see for example that if $I_3$ and $I_4$ are in a "0" or ground condition, $I_{s3}$ and $I_{s4}$ will be at ground while $\bar{I}_{s3}$ and $\bar{I}_{s4}$ will be at a negative potential. Therefore, X-decoding field-effect transistors 41, 42, 43, and 44 whose gates are connected to column leads $\bar{I}_{s3}$ and $\bar{I}_{s4}$ will be in a low-impedance condition while the remaining field-effect transistors will be in a high-impedance condition. Therefore, capacitor 36 is discharged through field-effect transistors 41 and 42 in parallel, capacitor 37 is discharged through field-effect transistor 43, and capacitor 38 is discharged through field-effect transistor 44, all being discharged to the ground appearing on input terminal $\Phi_2$ during the second time interval. Capacitor 39 is not discharged since the only field-effect transistors connected thereto, 46 and 47 are driven at their gates by the ground signals on leads $I_{s3}$ *and* $I_{s4}$. Therefore, only lead $X_1$ connecting capacitor 39 to the matrix 16 will have a negative potential thereon while the remaining leads $X_2$, $X_3$, and $X_4$ connected to capacitors 36, 37, and 38, respectively, will be at ground.

It can similarly be seen that, through the appropriate pattern of the eight X-decoding transistors such as 41, 42, etc., for each of the four possible permutations of input signals applied to the input terminals $I_3$ and $I_4$, a negative signal will be generated on one and only one of the leads $X_1$ through $X_4$ connecting the capacitors 39 through 36, respectively, to the matrix 16 in accordance with the truth table of FIG. 6.

To retrieve an information bit stored in the storage section 18 of the matrix 16, see FIGS. 1, 2, and 4, a four-bit data word is applied by means not shown to input terminals $I_1$ through $I_4$. At time $T_1$, see FIG. 4, the phase splitters 10, 11, 12, and 13 are enabled by a signal applied to enabling leads $\Phi_1$ thereof to pass the applied data word to the leads $I_{s1}$ through $I_{s4}$. and the complement of the applied data word to the leads $\bar{I}_{s1}$ through $\bar{I}_{s1}$. A timing signal applied by means not shown to input terminal $\Phi_2$ of the X-decoding circuitry 14 precharges the capacitors 36, 37, 38, and 39, during the interval from $T_0$ to $T_2$. At time $T_2$, the signal on input terminal $\Phi_2$ goes to ground selecting the X-lead to be enabled in accordance with the third and fourth bits of the four bit data word thereby accessing a single column of the storage portion 18 of the matrix 16. The signal on the lead $\Phi_2$ can be brought to its negative condition any time prior to $T_2$ so long as the interval between the appearance of the negative signal and the occurrence of the time $T_2$ is sufficient to precharge the capacitors 36, 37, 38, and 39.

A timing signal applied by means not shown to the input terminal $\Phi_3$ of the matrix 16 precharges the capacitors 26, 27, 28 and 29 as previously described. At time $T_3$, when the signal on the input terminal $\Phi_3$ returns to ground level, the capacitors 26, 27, 28, and 29 are discharged if any field-effect transistor connected thereto is in an ON impedance condition.

The field-effect transistors in the Y-decoding section 17 of the matrix 16 will be in ON or OFF conditions in accordance with the signals applied to input terminals $I_1$ and $I_2$. The field-effect transistors in the storage section 18 of the matrix 16 will be ON or OFF in accordance with the signals generated by the X-decoding circuitry 14.

The field-effect transistors in the Y-decoding section 17 of the matrix 16 are arranged so that, for each of the four permutations of the two signals applied to the input terminals $I_1$ and $I_2$, all but one of the capacitors 26, 27, 28 and 29 are discharged thereby. Since the X-decoding circuitry 14 enables only one column in the storage section 18 of the matrix 16, all of the capacitors 26, 27, 28, and 29 will be discharged if a device (transistor) exists in the storage section 18 of the matrix 16 in the column selected by the X-decoding circuitry 14 and the row which is not discharged by the field-effect transistors in the Y-decoding section 17 of the matrix 16. If no device exits at this at this storage location, the capacitor connected to this "selected" row remains charged.

At time T4 the output circuitry 19 comprising essentially an OR gate is enabled to detect the presence of a negative signal on any of the capacitors 26, 27, 28 and 29. If a negative signal is detected, a "1" is indicated for the position accessed (corresponding to the absence of a transistor at this position) by the four-bit data word on the input terminals $I_1$, $I_2$, $I_3$ and $I_4$. If ground appears on all the capacitors 26, 27, 28, and 29 (corresponding to the presence of a transistor at the accessed position) a "0" is indicated. Preferably, the pattern of transistors (present or absent) is programmed during manufacture to provide output signals for the particular permutations of input bits desired for each particular function.

The arrangement and operation of the Y-decoding portion 17 of the matrix 16 is similar to the X-decoding circuitry 14. However, an important difference exists in the fact that the X-decoding circuitry 14 presents voltage levels on inputs $X_1$ through $X_4$ to matrix 16 while Y-decoding portion 17 of the matrix 16 controls impedance conditions within the matrix 16 of which the Y-decoding portion 17 is an integral part. FIG. 7 shows the truth table for the selection of rows by the Y-decoding circuitry 17 where "1" represents a high-impedance condition and "0" a low-impedance condition.

It should be noted that the memory described is accessed solely by column conductors (access columns $I_{s1}$, $\bar{I}_{s1}$, etc. and memory columns $X_1$, $X_2$, etc.) rather than by column and row conductors. This arrangement is particularly useful when building integrated circuit memories because the regular arrangement of the matrix 16 enables the Y-decoding function normally performed by additional circuitry to be more compactly included within the matrix 16.

ALTERNATE EMBODIMENT

A second memory system embodying the principles of this invention is shown in FIG. 5. In the second embodiment a four bit data word applied to input terminals $I_1$, $I_2$, $I_3$, and $I_4$ actuates phase splitters 10, 11, 12, and 13. The phase splitters 10, 11, 12, and 13 in FIG. 5 are identical to the phase splitters 10, 11, 12, and 13 in the first embodiment. Static phase splitters or inverters which do not require clocking signals may also be employed in the embodiment shown in FIG. 5. The output signals from the phase splitters 12 and 13 are applied to X-decoding circuitry 14 which may be identical to the X-decoding circuitry 14 shown in FIG. 2. The X-decoding function performed by the X-decoding circuitry 14 may also be performed by a static X decoder such as the one described in the above-mentioned Heeren application "Code Translating Circuits."

The output from the phase splitters 10 and 11 and X-decoding circuitry 14 drive column conductors $I_{s1}$, $\bar{I}_{s1}$, $I_{s2}$, $\bar{I}_{s2}$, $X_1$, $X_2$, $X_3$, and $X_4$ of a memory matrix 48 having a Y-decoding section 49 and a storage section 51. Field-effect transistors are arranged in columns and rows with gates of field effect transistors being connected to the above-mentioned column conductors while the source and drain of each field-effect transistor is connected between adjacent row conductors 52, 53, 54, 56, and 57. With five row conductors, there are four rows of field-effect transistors connected therebetween.

A negative potential −V is applied to the uppermost row conductor 52 so that, if at least one field-effect transistor in each row is in an ON condition, the negative potential −V will appear on an output terminal 58 directly connected to the row conductor 57.

The field-effect transistors in the Y-decoding section are arranged to provide an ON impedance in all but one of the rows in accordance with the truth table of FIG. 7. For example, if the four-bit data word applied to the input terminals $I_1$, $I_2$, $I_3$, and $I_4$ were "0 1 0 1," the first bit applied to phase splitter 10 would provide a "0" on the column conductor $I_{s1}$ and a "1" on the column conductor $\bar{I}_{s1}$ thereby actuating field-effect transistors 59 and 61. The "1" applied to the input terminal $I_2$ will actuate phase splitter 11 to provide a "1" on column conductor $I_{s2}$ and a "0" on column conductor $\bar{I}_{s2}$. The "1" on column conductor $I_{s2}$ actuates field-effect transistors 62 and 63. Therefore, it is seen that row conductors 52 and 53 are connected by the ON impedance of field-effect transistor 63. Row conductors 54 and 56 are connected by the low impedance of the parallel combination of field-effect transistors 59 and 62. Row conductors 56 and 57 are connected by the low impedance of field-effect transistor 61. Therefore, a high impedance now exits only between row conductors 53 and 54. In this way the Y-decoding section 49 of the matrix 48 has selected that row so that a negative signal will appear on the output 58 if the X-column lead selected actuates a device connected between row conductors 53 and 54 such as column conductor $X_2$. If no device is connected between row conductors 53 and 54 for the column selected by X-decoding circuitry 14 such as column conductor $X_1$, a ground signal will remain on the output terminal 58.

To complete the example cited above where the input data word is "0 1 0 1," the X-decoding circuitry 14 in accordance with the truth table of FIG. 6 will select column conductor $X_2$, thereby actuating field effect transistor 64 and completing the connection between the voltage −V and the output terminal 58.

A field-effect transistor 66 is connected between the output terminal 58 and ground to be driven from a pulse source not shown for discharging stray capacity represented by capacitor 67 before each accessing of the matrix 48. A fixed impedance to ground could replace the field-effect transistor 66. The fixed impedance should have a value high compared to the ON impedance or closed circuit impedance of the matrix 48 and low compared with the OFF impedance or open circuit impedance of the matrix 48.

It should be understood that various other embodiments and modifications can be made by those skilled in the art without departing from the spirit and scope of the invention.

We claim:

1. An improved read-only memory array in which switching signal controlled impedance devices, each having a control electrode and first and second controlled electrodes, are selectively positioned at intersections of columns and rows; said control electrodes of said devices in each column being connected to respective column conductors; said first and second controlled electrodes, respectively, of said devices in each row being connected to respective row conductors; each of said controlled impedance devices exhibiting an ON impedance between said first and second controlled electrodes and between their respective row conductors in response to a switching signal applied to said control electrode and an OFF impedance between said controlled electrodes and between their respective row conductors in the absence of a switching signal at said control electrode; said array characterized by: a first portion of said devices being located at selected positions in accordance with a desired information pattern; a second portion of said devices being located at selected positions in accordance with a decoding matrix; and means for selectively supplying at least a part of a switching signal pattern to the column conductors associated with said second portion of said devices for providing an ON impedance in all but a select one of said rows different ones of said rows being selected for different switching signal patterns.

2. A read-only memory array as defined in claim 1, also including:

means for providing a logical output signal, said logical output signal exhibiting a first logical level in response to said OFF impedance condition existing everywhere in one of said rows and a second logical level in response to said ON impedance condition existing in all of said rows.

3. A read-only memory as defined in claim 2 wherein the switching signal pattern is a multibit data word for providing said logical output signal and also including means responsive to less than all of the bits of said multibit data word for selecting one device in the first portion of the select row for interrogation and means responsive to the remaining bits of said multibit data word for providing the part of the switching signal pattern to said column conductors of said second portion.

4. A read-only memory as defined in claim 3 in which said selecting means includes a decoding circuit.

5. In combination:

a first plurality of field-effect transistors each having a source, a drain, and a gate and exhibiting a source-to-drain impedance dependent upon a signal applied to said respective gates;

means for connecting said source-to-drain impedances of said first plurality of field-effect transistors in parallel to provide a first row impedance;

a second plurality of field-effect transistors each having a source, a drain, and a gate and exhibiting a source-to-drain impedance dependent upon a signal applied to said respective gates;

means for connecting said source-to-drain impedances of said second plurality of field-effect transistors in parallel to provide a second row impedance;

a third plurality of field-effect transistors each having a source, a drain, and a gate and exhibiting a source-to-drain impedance dependent upon a signal applied to said respective gates;

means for connecting said source-to-drain impedances of said third plurality of field-effect transistors in parallel to provide a third row impedance;

means for connecting said gates of select ones of said field-effect transistors from said first, second, and third rows to define columns; and means for sensing a low-impedance condition existing for all of said row impedances.

6. The combination as defined in claim 5 in which said means for sensing includes:

means for connecting said first, second, and third row impedances in series; and means for applying a reference potential to said impedances in series.

7. A memory array, which comprises:

a plurality or row conductors; first and second groups of column conductors intersecting the row conductors;

means for applying predetermined signals to the column conductors; and a plurality of variable impedance devices whose impedance state will change when a predetermined signal is applied and which are present at predetermined intersections of the row and column conductors, the presence/absence pattern of the impedance devices at intersections involving the first group of the column conductors representing information stored, and the presence/absence pattern of the impedance devices at intersections involving the second group of the column conductors causing the application of each of different predetermined patterns of the predetermined signals to the column conductors of the second group to result in a corresponding different one only of the row conductors having its impedance devices, associated with the second group column conductors, all in their unchanged impedance states, each impedance device having a control electrode connected to the corresponding column conductor and two other electrodes connected in a distinct parallel path to the corresponding row conductor, the level of the applied signal to the control electrode of the impedance device determining the impedance between the two other electrodes thereof.

8. A memory array according to claim 7, further comprising:

means for providing a first level output signal in response to unchanged impedance states existing for all the impedance devices connected to any one of the row conductors, and a second level output signal in response to all of the row conductors having at least one of the impedance devices connected thereto in its changed impedance state.

9. A memory array according to claim 7, further comprising:

means for connecting the parallel paths connected to each row conductor to the parallel paths connected to each adjacent row conductor, so that a reference voltage applied to the first row conductor will cause a different voltage to appear at the last row conductor depending on whether or not at least one of the parallel paths of every row conductor is in its changed impedance state.

10. A memory array according to claim 7, wherein the impedance devices comprise MOS field-effect transistors.

11. An improved MOS read-only memory array, for reading out stored information in response to various permutations of an N-bit binary data signal, N being at least 4, of the type wherein:

a. the data signal is divided into two parts X and Y of $p$ and $q$ bits each, respectively, $p$ and $q$ each being at least 2 and totaling N;
b. the groups X and Y are separately decoded to provide a 1 out of $2^p$ and a 1 out of $2^q$ distinctive output signal in response to each possible permutation of the data signals;
c. the X-Y-decoded outputs are impressed on an X-Y-memory array, each X-Y-crosspoint of which constitutes a distinctive memory location corresponding to one of the permutations;
d. the memory locations are programmed with stored information by either providing or not providing an actuable MOS field-effect transistor (FET) at each crosspoint, each FET having a control terminal and first and second controlled terminals, which FET, if present, is turned on in response to the corresponding X-Y-signal;
e. means are provided for reading out the state of the selected FET location to provide an output binary signal in response to each applied data signal, the improved memory array being characterized in that:

the memory includes a combined, unitary matrix having a memory-storage section and a Y-decoding section having common row conductors, each section having a plurality of FETs arranged in a selected pattern forming a grid, the first and second controlled terminals of the FETs being connected to the row conductors, the storage section having $2^q$ column conductors responsive to the X-decoder, a selected one of which is energized for each permutation of X-digits, the Y-decoding section having a plurality of column conductors activated in response to unique patterns in each permutation of Y-digits, the Y-decoding FETs being patterned to actuate one row conductor of the matrix for each permutation of Y-digits.

12. The memory as recited in claim 11, wherein: the storage section column conductors are applied to the control terminals of associated FETs in the memory-storage section.

13. In an improved memory having columns and orthogonal rows of field-effect transistors having parasitic capacitance, wherein selected ones of the transistors are formed to represent memory data bits of one binary sense and the remaining transistors are unformed to represent memory data bits of the other binary sense, the improvement comprising:

means for shunting the parasitic capacitance of the transistors in all but one of the rows of field-effect transistors;

means for energizing the gates of a selected column of the field-effect transistors to energize the field-effect transistors of that column to their low-impedance state, thereby shunting their parasitic capacitance; and means for sensing if any parasitic capacitance of any field-effect transistor remains unshunted, thereby indicating that the field-effect transistor and the intersection of the unshunted row and shunted column was unformed to represent a data bit of the other binary sense.

14. In an improved integrated circuit component having a plurality group of field-effect transistor locations arranged thereon, each such field-effect transistor potentially having a source, a drain, and a gate when formed in the integrated circuit, one group of the field-effect transistors being arranged in columns and rows and being selectively formed to represent data memory bits of one binary sense or remaining unformed to represent data memory bits of the other binary senses wherein the improvement comprises:

a second group of the field-effect transistors arranged in columns and rows and being selectively formed to represent a decoding matrix, with the source and drain circuits of the rows of field-effect transistors of the second group being connected in parallel with and individually associated with the source and drain circuits of the rows of the one group of field-effect transistors whereby receipt of an input code signal by the second group of field-effect transistors shunts with a low-impedance path the source and drain circuits of all but one of the rows of the one group of field-effect transistors;

means responsive to input signals for energizing the gates of a single column of the field-effect transistors of the one group to maintain the field-effect transistors of that column in their low-impedance state; and means for sensing if the row of the one group that was not shunted by the second group experiences a low-impedance, thereby indicating that a field-effect transistor is formed at the junction of unshunted row and the energized column of the one group of field-effect transistors, thereby indicating a data memory bit of the one binary sense.

15. An apparatus according to claim 14 wherein the energizing means comprises a third group of the field-effect transistors arranged in columns and rows and being selectively formed to represent a decoding matrix, with the source and drain circuits of the rows of field-effect transistors of the third group being connected to and individually associated with the gates of columns of the one group of field-effect transistors receipt of input signals by the third group of field-effect transistors energizes the gates of a single column of the field-effect transistors of the one group to maintain the field-effect transistors of that column in their low-impedance state.

16. An integrated circuit according to claim 14 wherein the sensing means comprises means for sensing if any parasitic capacitance of any field-effect transistor remains unshunted.

17. An integrated circuit according to claim 14 wherein the sensing means comprises means for sensing electrical continuity through the several rows of the one group of field-effect transistors.

* * * * *

PO-1050
(5/69)

UNITED STATES PATENT OFFICE
CERTIFICATE OF CORRECTION

Patent No. 3,618,050 Dated November 2, 1971

Inventor(s) Richard H. Heeren - Charles R. Winston

It is certified that error appears in the above-identified patent and that said Letters Patent are hereby corrected as shown below:

Column 8, line 62, after "transistors" insert --whereby--.

Signed and sealed this 18th day of July 1972.

(SEAL)
Attest:

EDWARD M.FLETCHER,JR.
Attesting Officer

ROBERT GOTTSCHALK
Commissioner of Patents